(12) United States Patent
Yang

(10) Patent No.: US 7,843,646 B2
(45) Date of Patent: Nov. 30, 2010

(54) SWITCHABLE MAGNIFICATION LENS AND PHOTOGRAPHIC APPARATUS HAVING THE SAME

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 30 days.

(21) Appl. No.: 12/488,740

(22) Filed: Jun. 22, 2009

(65) Prior Publication Data

US 2010/0091380 A1   Apr. 15, 2010

(30) Foreign Application Priority Data

Oct. 9, 2008   (TW) .............................. 97138982 A

(51) Int. Cl.
G02B 15/02 (2006.01)
H04N 5/225 (2006.01)
G03B 17/00 (2006.01)

(52) U.S. Cl. .................. 359/673; 359/672; 348/360; 396/71

(58) Field of Classification Search .......... 348/360, 348/E5.028; 359/672, 673, 675, 827; 385/116, 385/121; 396/71, 73
See application file for complete search history.

(56) References Cited

U.S. PATENT DOCUMENTS

| 4,426,135 A | * | 1/1984 | Hashiya | ..................... 359/673 |
|---|---|---|---|---|
| 5,452,133 A | * | 9/1995 | Margolis | ..................... 359/672 |
| 5,528,416 A | * | 6/1996 | Hartmann | ..................... 359/381 |
| 5,600,751 A | * | 2/1997 | Peli | ........................... 385/116 |
| 6,008,845 A | * | 12/1999 | Ohyoshi | ..................... 348/360 |
| 2009/0135287 A1 | * | 5/2009 | Yang | ......................... 348/335 |
| 2009/0180019 A1 | * | 7/2009 | Yang | ......................... 348/335 |
| 2010/0091380 A1 | * | 4/2010 | Yang | ......................... 359/675 |

* cited by examiner

Primary Examiner—David N Spector
(74) Attorney, Agent, or Firm—Chun-Ming Shih; HDLS IPR Services

(57) ABSTRACT

A switchable magnification lens used to vary the magnification of an image going to be captured by a camera. The switchable magnification lens includes an outer barrel and a switchable magnification unit detachably arranged in the outer barrel and connected to the zoom lens. The image will be magnified while passing through the switchable magnification unit from a first end to a second end, and the image will be shrunk while passing through the switchable magnification unit from the second end to the first end. The switchable magnification unit is able to change its orientation with respect to the outer barrel. The image will be magnified while the first end is away from the camera and the second end is toward the camera, and the image will be shrunk while the first end is toward the camera and the second end is away from the camera.

22 Claims, 5 Drawing Sheets

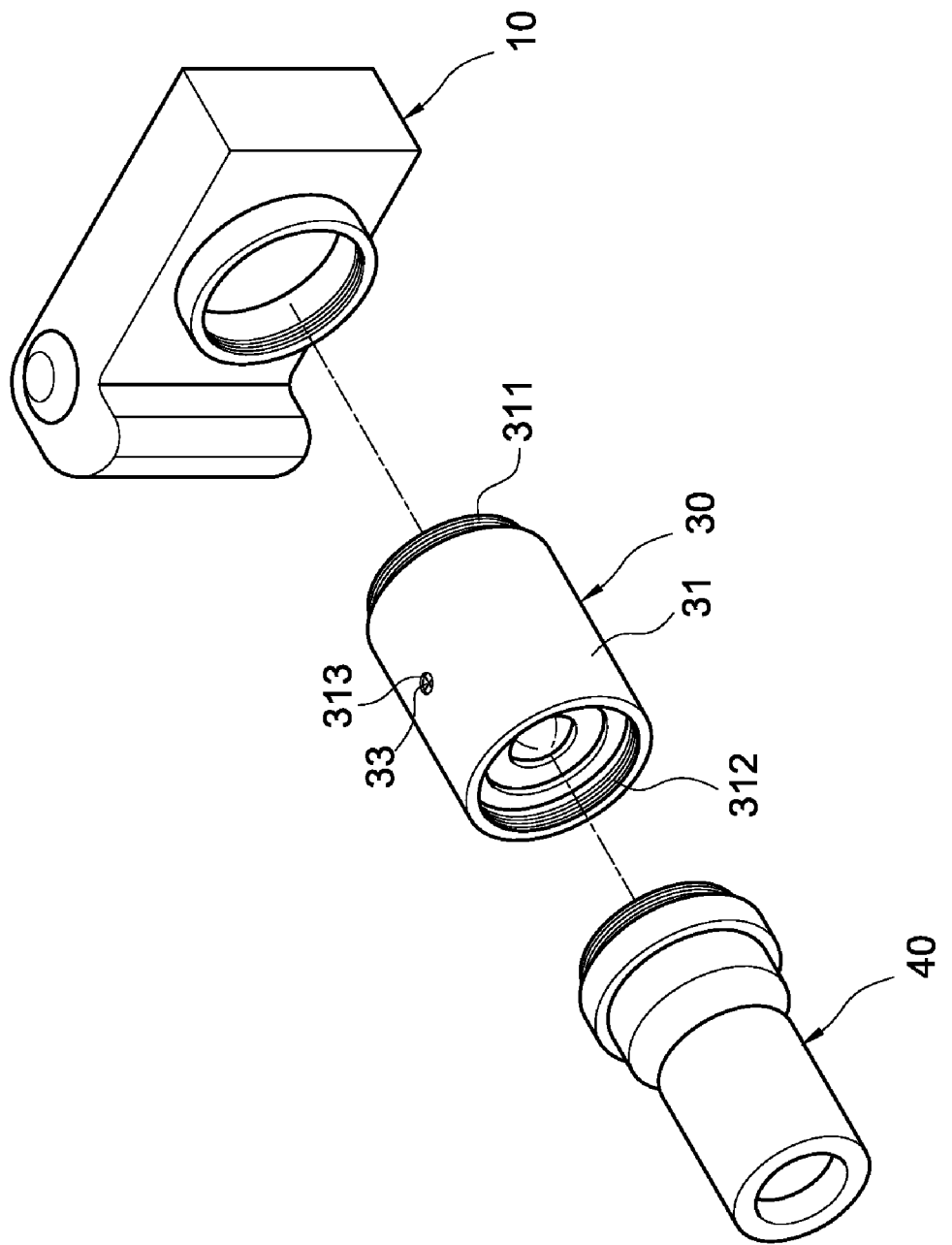

SWITCHABLE MAGNIFICATION LENS AND PHOTOGRAPHIC APPARATUS HAVING THE SAME

BACKGROUND OF THE INVENTION

1. Field of the Invention

The present invention relates to a switchable magnification lens, in particular to a switchable magnification lens for installing on a digital camera.

2. Description of Related Art

Digital camera has advantages of being capable of reviewing image immediately after the shot and digitally storing the shot result to electronic device like a computer or other digital storage device; it rapidly replaces the traditional film camera and becomes the mainstream of the camera market.

However, the maximum magnification power of the convention digital camera is in the range of 10× to 20×, it is difficult to perform a high-magnified shooting or a shrunk image shooting. Further, a conventional attachable zoom lens for installing to a digital camera has only one operation mode of either magnifying or shrinking. Users have to prepare both magnifying mode lens and shrinking mode lens to meet various shooting situations.

Therefore, how to provide a lens having both image magnify and shrink capabilities instead of preparing two modes of lenses, and to provide a lens having lower costs and better portability, has already become one of the major issues of the lens maker or the camera maker.

SUMMARY OF THE INVENTION

The object of present invention is to provide a switchable magnification lens having both image magnification and shrink capabilities.

Another object of present invention is to provide a photographic apparatus having the abovementioned switchable magnification lens.

In order to achieve aforementioned purpose, the present invention provides a switchable magnification lens, for coupling to a zoom lens of a camera through an adaptor and used to vary the magnification of an image going to be captured by the camera. The switchable magnification lens includes an outer barrel and a switchable magnification unit. The outer barrel is connected to the adaptor. The switchable magnification unit is detachably arranged in the outer barrel and is optically connected to the zoom lens. The switchable magnification unit includes a first end and a second end optically connected to the first end. The image will be magnified while passing through the switchable magnification unit from the first end to the second end, and the image will be shrunk while passing through the switchable magnification unit from the second end to the first end. The switchable magnification unit is able to change its orientation with respect to the outer barrel. The image will be magnified while the first end is away from the camera and the second end is toward the camera, and the image will be shrunk while the first end is toward the camera and the second end is away from the camera.

Besides, the present invention provides another switchable magnification lens, for coupling between a camera and a focusing lens and used to vary the magnification of an image going to be captured by the camera. The switchable magnification lens includes an outer barrel and a switchable magnification unit. The outer barrel is connected between the camera and the focusing lens. The switchable magnification unit is detachably arranged in the outer barrel and is optically connected to the focusing lens. The switchable magnification unit includes a first end and a second end optically connected to the first end. The image will be magnified while passing through the switchable magnification unit from the first end to the second end, and the image will be shrunk while passing through the switchable magnification unit from the second end to the first end. The switchable magnification unit is able to change its orientation with respect to the outer barrel. The image will be magnified while the first end is away from the camera and the second end is toward the camera, and the image will be shrunk while the first end is toward the camera and the second end is away from the camera.

Further, the present invention provides a photographic apparatus, including a camera, an adaptor and a switchable magnification lens. The camera is used to capture an image and having a zoom lens. The adaptor is attached on the camera and having a through hole through the zoom lens passes. The switchable magnification lens is coupled to the zoom lens of the camera through the adaptor and is used to vary the magnification of the image going to be captured by the camera. The switchable magnification lens includes an outer barrel and a switchable magnification unit. The outer barrel is connected to the adaptor, and the switchable magnification unit is detachably arranged in the outer barrel and is optically connected to the zoom lens. The switchable magnification unit includes a first end and a second end optically connected to the first end. The image will be magnified while passing through the switchable magnification unit from the first end to the second end, and the image will be shrunk while passing through the switchable magnification unit from the second end to the first end. The switchable magnification unit is able to change its orientation with respect to the outer barrel. The image will be magnified while the first end is away from the camera and the second end is toward the camera, the image will be shrunk while the first end is toward the camera and the second end is away from the camera.

Further, the present invention provides another photographic apparatus, including a camera, a focusing lens and a switchable magnification lens. The camera is used to capture an image. The focusing lens is used to focus on the image. The switchable magnification lens is coupled between the camera and the focusing lens and is used to vary the magnification of the image going to be captured by the camera. The switchable magnification lens includes a outer barrel and a switchable magnification unit. The outer barrel is connected between the camera and the focusing lens and the switchable magnification unit is detachably arranged in the outer barrel. The switchable magnification unit includes a first end and a second end optically connected to the first end. The image will be magnified while passing through the switchable magnification unit from the first end to the second end and the image will be shrunk while passing through the switchable magnification unit from the second end to the first end. The switchable magnification unit is able to change its orientation with respect to the outer barrel. The image will be magnified while the first end is away from the camera and the second end is toward the camera. The image will be shrunk while the first end is toward the camera and the second end is away from the camera.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 6 is a perspective view of a second embodiment the photographic apparatus of the present invention.

DETAILED DESCRIPTION OF THE INVENTION

A detailed description of the present invention will be made with reference to the accompanying drawings.

Figure 1:
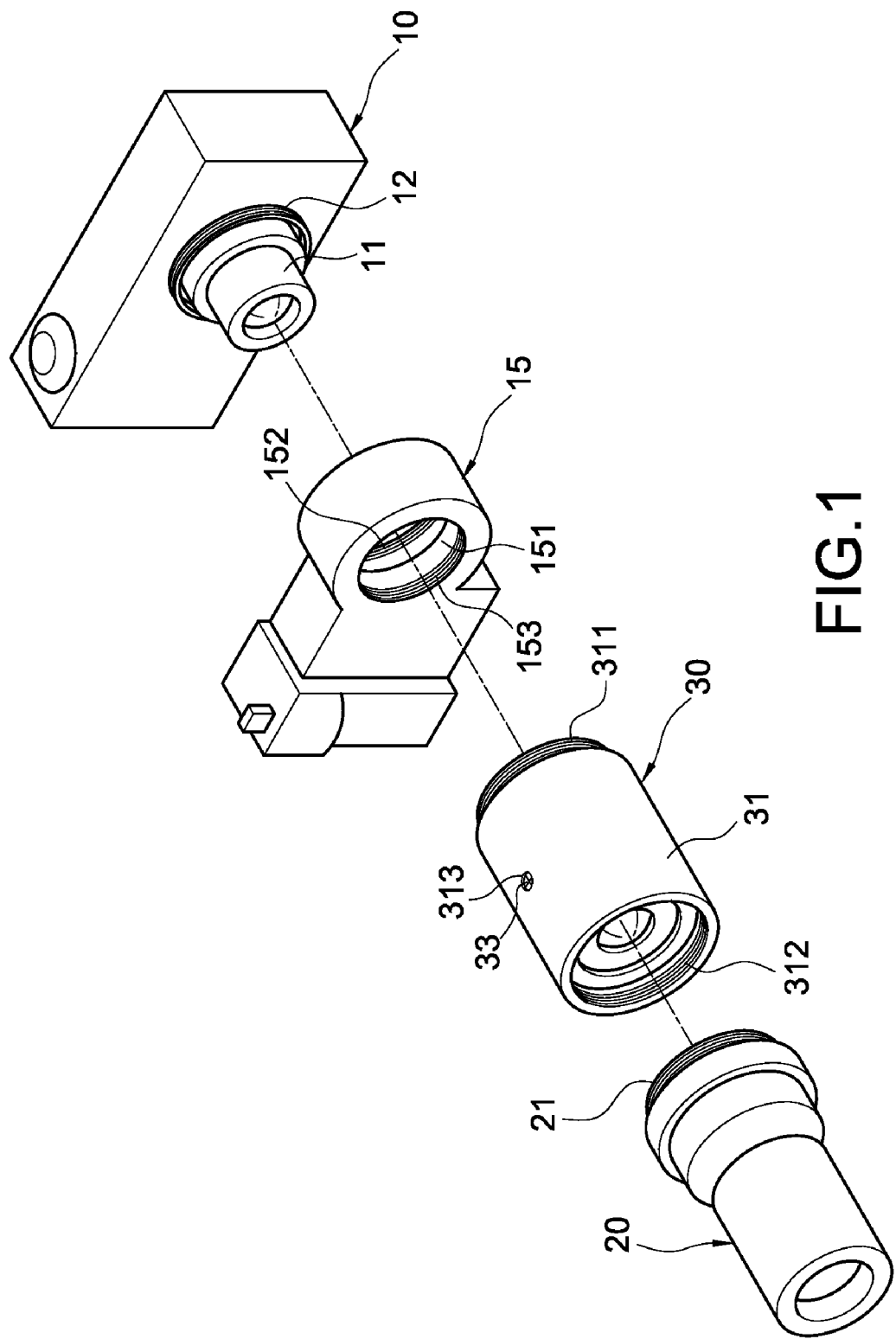
FIG. 1 is a perspective view of a first embodiment the photographic apparatus of the present invention.

FIG. 1 is a perspective view of the photographic apparatus according to the first embodiment of the present invention. The photographic apparatus includes a camera 10, an adapter 15, a prime lens 20 and a switchable magnification lens 30.

The camera 10 is used to capture an image. In this embodiment, the camera 10 is a compact digital camera having a zoom lens 11 used to focusing on the image. Besides, the camera 10 has a male treaded portion 12 for connecting with the adaptor 15.

The adaptor 15 is attached to the camera 10 through the adaptor 15 and has a through hole 151 through the zoom lens passes 11. The adapter 15 has a first female threaded portion 152 adjacent to the camera 10 and a second female threaded portion 153 away from the camera 10.

Figure 2:
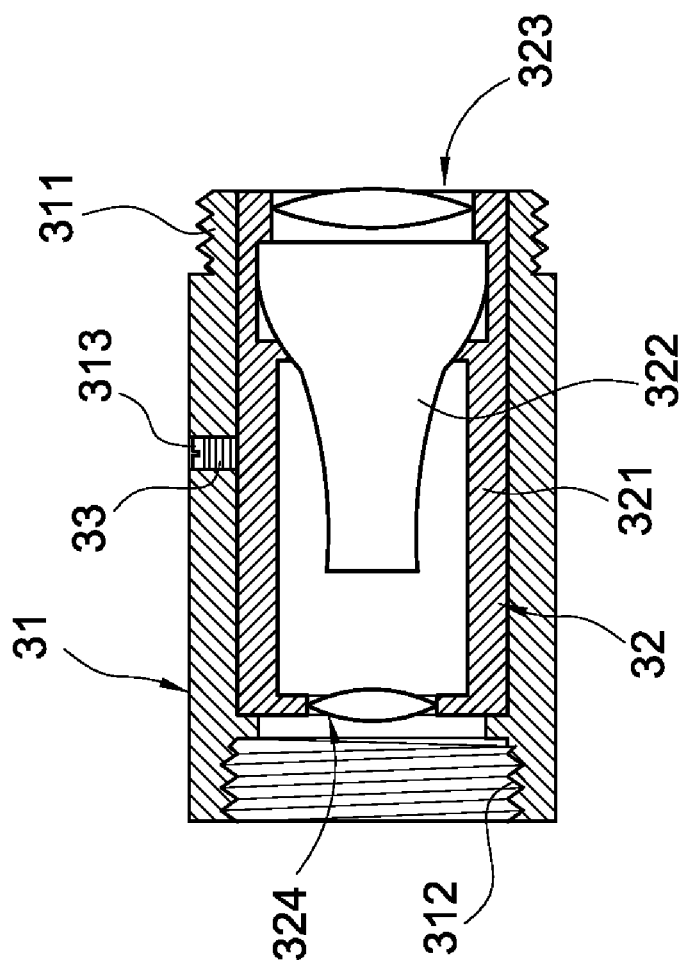
FIG. 2 is a cross-sectional view of a switchable magnification lens of the photographic apparatus.

As FIG. 1 and FIG. 2 show, the switchable magnification lens 30 is coupled to the zoom lens 11 of the camera 10 through the adaptor 15 and used to vary the magnification of the image to be captured by the camera 10, the switchable magnification lens 30 includes an outer barrel 31 connected to the adaptor 15, and a switchable magnification unit 32 detachably arranged in the outer barrel 31 and optically connected to the zoom lens 11.

The outer barrel 31 has a male treaded portion 311 for connecting to the second female threaded portion 153 of the adapter 15, and a female treaded portion 312 for connecting to the prime lens 20. Besides, a screw hole 313 is defined on the outer barrel 31.

The switchable magnification unit 32 includes an inner barrel 321 detachably arranged in the outer barrel 31 and a plurality of optical elements (not labeled) arranged in the inner barrel 321.

The switchable magnification lens 30 further includes a screw 33 correspondingly located in the screw hole 313 for fixing. In this embodiment, the screw 33 is a hexagon socket head cap screw, but not limited thereto. Besides, in practical applications, the other detachably fixing approach for fixing the switchable magnification unit 32 to the outer barrel 31 could be apparent to those skilled in the art.

In this embodiment 1, the optical elements in the inner barrel 321 include a plurality of optical lenses and a fiber optic taper 322. The fiber optic taper 322 is made of optical fibers which processed through bundling, annealing, stretching and cutting. The magnification power of the fiber optic taper is decided by the ratio of the areas of the two opposite facets thereof.

Therefore, the switchable magnification unit 32 provides a first end 323 and a second end 324 optically connected to the first end 323. The first end 323 is adjacent to the male treaded portion 311 of the outer barrel 31 and the second end 324 is adjacent to the female treaded portion 312. Since the facet of the fiber optic taper 322 adjacent to the first end 323 has smaller area than the facet of the fiber optic taper 322 adjacent to the second end 324, the image will be magnified while passing through the switchable magnification unit 32 from the first end 323 to the second end 324.

Figure 3:
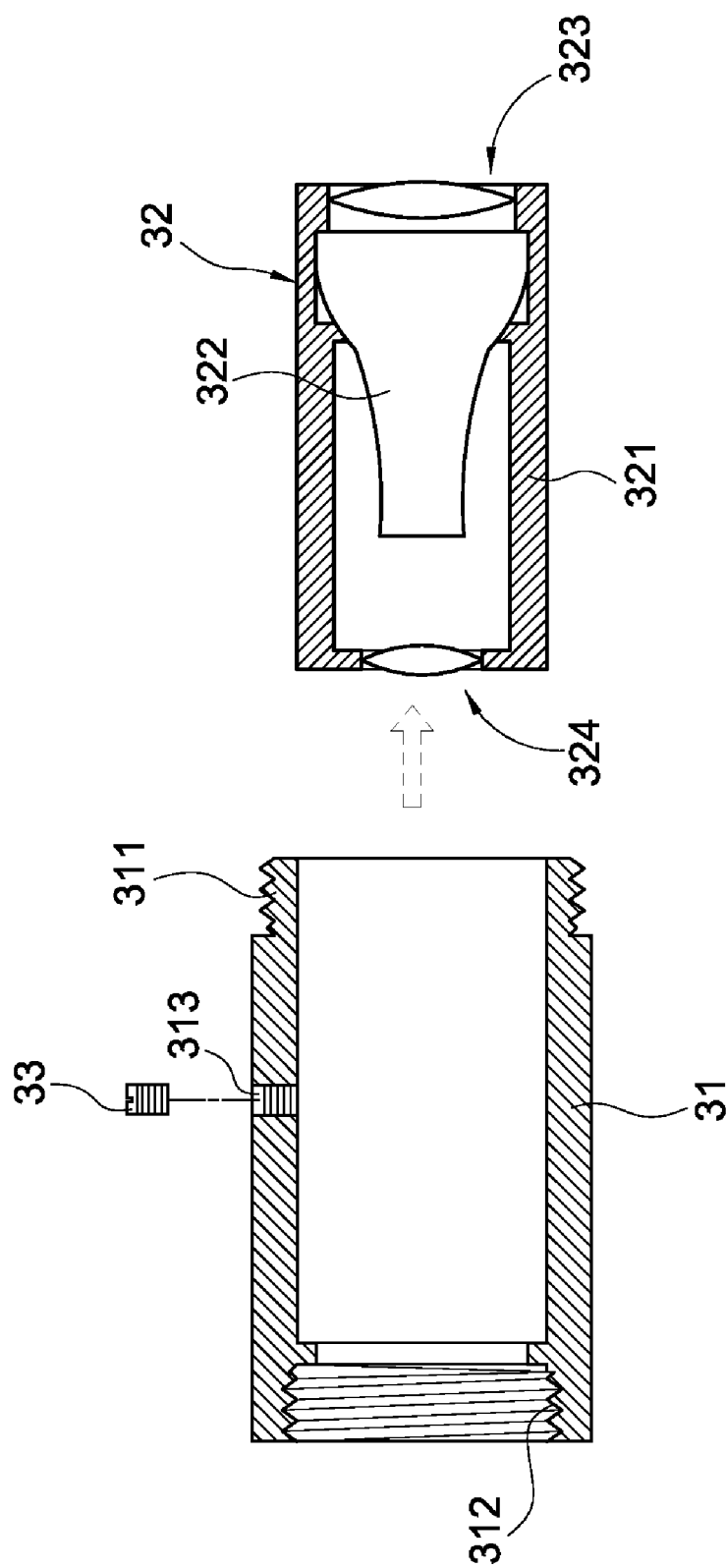
FIG. 3 is a decomposed cross-sectional view of a switchable magnification lens in FIG. 2.
Figure 4:
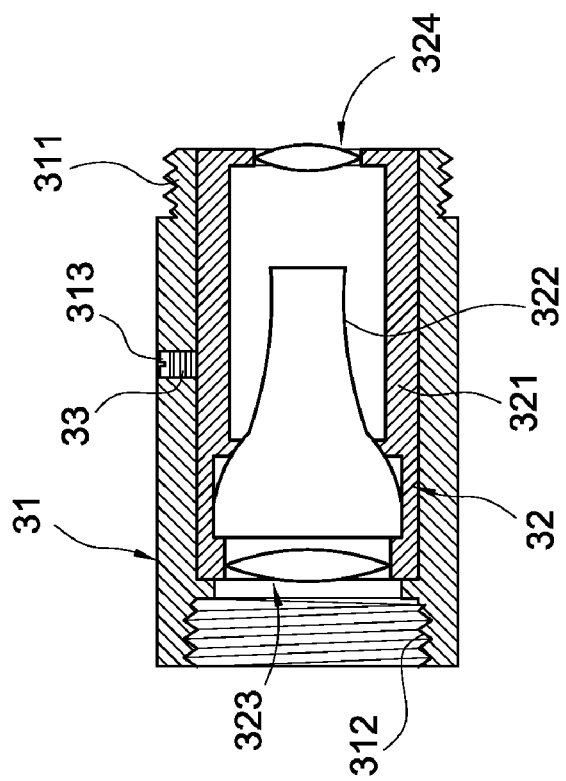
FIG. 4 is a recomposed cross-sectional view of a switchable magnification lens in FIG. 3.

On the contrary, the image will be shrunk while passing through the switchable magnification unit 32 from the second end 324 to the first end 323. The switchable magnification unit 32 is able to change its orientation with respect to the outer barrel 31. The image will be magnified while the first end 323 is away from the camera 10 and the second end 324 is toward the camera 10, the image will be shrunk while the first end 323 toward the camera 10 and the second end 324 away from the camera 10. As FIG. 3 shows, user first takes out the screw 33 from the screw hole 313 of the outer barrel 31 to unfix the switchable magnification unit 32, and pulls the switchable magnification unit 32 out. Then, as FIG. 4 shows, user changes the orientation of the switchable magnification unit 32 and reinstalls the switchable magnification unit 32 into the outer barrel 31. As a consequent, the second end 324 is adjacent to the male treaded portion 311 of the outer barrel 31 and the first end 323 is adjacent to the female treaded portion 312. Therefore, the image will be shrunk while passing through the switchable magnification unit 32 to the camera.

Figure 5:
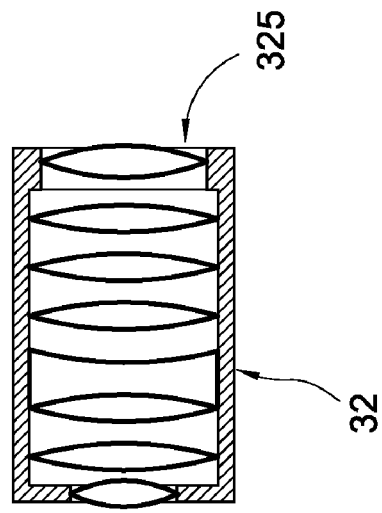
FIG. 5 is a cross-sectional view of a switchable magnification unit of the switchable magnification lens.

Besides, as FIG. 5 shows, it provides another kind of switchable magnification unit 32, includes a plurality of lenses as the optical elements. Those lenses can also provide an equivalent magnification power as the fiber optic taper.

As FIG. 1 shows, the prime lens 20 is additionally optically connected to the switchable magnification lens 30. The prime lens 20 may be a microscope lens, telescope lens or an endoscope lens. The prime lens 20 has a male threaded portion 21 for connecting to the female treaded portion 312 of the switchable magnification lens 30. In practical use, the prime lens 20 is detachable to meet the practical situation.

FIG. 6 shows a perspective view of the photographic apparatus according to second embodiment of the present invention. The photographic apparatus is similar to the first embodiment the photographic apparatus. The differences between them are that the camera 10 is a digital single lens reflex camera (DSLR) without a zoom lens and the switchable magnification lens 30 is directly attached on the camera 10 without an adaptor. Further, a focusing lens is provided to connect to the switchable magnification lens 30 for providing automatic or manual focusing function to camera 10.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A switchable magnification lens, coupled to a zoom lens of a camera through an adaptor and used to vary the magnification of an image to be captured by the camera, the switchable magnification lens comprising:

an outer barrel connected to the adaptor; and
a switchable magnification unit detachably arranged in the outer barrel and optically connected to the zoom lens, the switchable magnification unit comprising a first end and a second end optically connected to the first end, wherein the image is magnified while passing through the switchable magnification unit from the first end to the second end and the image is shrunk while passing through the switchable magnification unit from the second end to the first end, wherein the switchable magnification unit is able to change its orientation with respect to the outer barrel, the image is magnified while the first end is away from the camera and the second end is toward the camera, the image is shrunk while the first end is toward the camera and the second end is away from the camera.

2. The lens according to claim 1, wherein a screw hole is defined on the outer barrel and the switchable magnification lens further comprises a screw located in the screw hole for fixing the switchable magnification unit to the outer barrel.

3. The lens according to claim 1, wherein the switchable magnification unit comprises an inner barrel detachably arranged in the outer barrel and a plurality of optical elements arranged in the inner barrel.

4. The lens according to claim 3, wherein the optical elements comprises a fiber optic taper.

5. The lens according to claim 3, wherein optical elements comprises a plurality of lenses.

6. A switchable magnification lens, coupled between a camera and a focusing lens and used to vary the magnification of an image to be captured by the camera, the switchable magnification lens comprising:

an outer barrel connected between the camera and the focusing lens; and a switchable magnification unit detachably arranged in the outer barrel and optically connected to the focusing lens, the switchable magnification unit comprising a first end and a second end optically connected to the first end, wherein the image is magnified while passing through the switchable magnification unit from the first end to the second end, and the image is shrunk while passing through the switchable magnification unit from the second end to the first end, wherein the switchable magnification unit is able to change its orientation with respect to the outer barrel, the image is magnified while the first end is away from the camera and the second end is toward the camera, the image is shrunk while the first end is toward the camera and the second end is away from the camera.

7. The lens according to claim 6, wherein a screw hole is defined on the outer barrel and the switchable magnification lens further comprises a screw located in the screw hole for fixing the switchable magnification unit to the outer barrel.

8. The lens according to claim 6, wherein the switchable magnification unit comprises an inner barrel detachably arranged in the outer barrel and a plurality of optical elements arranged in the inner barrel.

9. The lens according to claim 8, wherein the optical elements comprises a fiber optic taper.

10. The lens according to claim 8, wherein optical elements comprises a plurality of lenses.

11. A photographic apparatus, comprising:

a camera used to capture an image and having a zoom lens;

an adaptor attached on the camera and having a through hole through the zoom lens passes;

a switchable magnification lens for coupling to the zoom lens of the camera through the adaptor and used to vary the magnification of the image going to be captured by the camera, the switchable magnification lens comprising an outer barrel and a switchable magnification unit, the outer barrel connected to the adaptor, and the switchable magnification unit detachably arranged in the outer barrel and optically connected to the zoom lens, the switchable magnification unit comprising a first end and a second end optically connected to the first end, the image is magnified while passing through the switchable magnification unit from the first end to the second end, and the image is shrunk while passing through the switchable magnification unit from the second end to the first end, wherein the switchable magnification unit is able to change its orientation with respect to the outer barrel, the image is magnified while the first end is away from the camera and the second end is toward the camera, the image is shrunk while the first end is toward the camera and the second end is away from the camera.

12. The apparatus according to claim 11, wherein a screw hole is defined on the outer barrel and the switchable magnification lens further comprises a screw located in the screw hole for fixing the switchable magnification unit to the outer barrel.

13. The apparatus according to claim 11, wherein the switchable magnification unit comprises an inner barrel detachably arranged in the outer barrel and a plurality of optical elements arranged in the inner barrel.

14. The apparatus according to claim 13, wherein the optical elements comprises a fiber optic taper.

15. The apparatus according to claim 13, wherein optical elements comprises a plurality of lenses.

16. The apparatus according to claim 11, further comprising a prime lens optically connected to the switchable magnification lens.

17. The apparatus according to claim 16, wherein the prime lens is a microscope lens, telescope lens or an endoscope lens.

18. A photographic apparatus, comprising:

a camera used to capture an image;

a focusing lens used to focus on the image; and a switchable magnification lens coupled between the camera and the focusing lens and used to vary the magnification of the image to be captured by the camera, the switchable magnification lens comprising an outer barrel and a switchable magnification unit, the outer barrel connected between the camera and the focusing lens and the switchable magnification unit detachably arranged in the outer barrel, the switchable magnification unit comprising a first end and a second end optically connected to the first end, wherein the image is magnified while passing through the switchable magnification unit from the first end to the second end, and the image is shrunk while passing through the switchable magnification unit from the second end to the first end, wherein the switchable magnification unit is able to change its orientation with respect to the outer barrel, the image is magnified while the first end is away from the camera and the second end is toward the camera, the image is shrunk while the first end is toward the camera and the second end is away from the camera.

19. The apparatus according to claim 18, wherein a screw hole is defined on the outer barrel and the switchable magnification lens further comprises a screw located in the screw hole for fixing the switchable magnification unit to the outer barrel.

20. The apparatus according to claim 18, wherein the switchable magnification unit comprises an inner barrel detachably arranged in the outer barrel and a plurality of optical elements arranged in the inner barrel.

21. The apparatus according to claim 20, wherein the optical elements comprises a fiber optic taper.

22. The apparatus according to claim 20, wherein optical elements comprises a plurality of lenses.

* * * * *